(12) United States Patent
Husmann et al.

(10) Patent No.: US 7,514,649 B2
(45) Date of Patent: Apr. 7, 2009

(54) BUILT-IN ATTACHMENT DEVICE USING SELECTIVE LASER SINTERING

(75) Inventors: Christopher H. Husmann, Gardena, CA (US); Gregory N. Stein, Moreno Valley, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 11/220,099

(22) Filed: Sep. 6, 2005

(65) Prior Publication Data
US 2007/0051704 A1 Mar. 8, 2007

(51) Int. Cl.
*B23K 26/00* (2006.01)
*B29C 35/08* (2006.01)
(52) U.S. Cl. .................. 219/121.85; 264/497
(58) Field of Classification Search ............. 219/121.6, 219/121.85; 264/497
See application file for complete search history.

(56) References Cited

U.S. PATENT DOCUMENTS

| | | | |
|---|---|---|---|
| 3,198,561 A | 8/1965 | Witt | |
| 3,306,542 A | 2/1967 | Camboulives | |
| 3,651,661 A | 3/1972 | Darrow | |
| 3,734,546 A * | 5/1973 | Herbert et al. | ................. 285/49 |
| 5,358,013 A | 10/1994 | McClain | |
| 5,518,277 A | 5/1996 | Sanders | |
| 6,070,659 A | 6/2000 | Hosoya | |
| 6,245,281 B1 | 6/2001 | Scholten et al. | |
| 6,495,794 B2 * | 12/2002 | Shi | ................. 219/121.72 |
| 6,547,287 B1 | 4/2003 | Shah et al. | |
| 2002/0100750 A1 * | 8/2002 | Shi | ................. 219/121.85 |
| 2004/0021256 A1 * | 2/2004 | DeGrange et al. | ........... 264/497 |
| 2004/0254665 A1 | 12/2004 | Fink et al. | |
| 2005/0285314 A1 * | 12/2005 | Macke et al. | ................. 264/497 |

\* cited by examiner

*Primary Examiner*—Kevin P Kerns
(74) *Attorney, Agent, or Firm*—Stetina Brunda Garred & Bruckner

(57) ABSTRACT

A method of assembling a first part and a second part. The method includes the step of integrally forming an attachment device and a first part. For example, the attachment device may be a nut plate operative to retain a nut therein, and the first part may be an air duct. The nut plate and the air duct may be integrally formed via selective laser sintering or stereo lithography such that the nut plate is an integral feature of the air duct. A nut may be retained in the nut plate, and a mating bolt may engage the nut to attach the air duct (i.e., the first part) to the second part.

13 Claims, 4 Drawing Sheets

BUILT-IN ATTACHMENT DEVICE USING SELECTIVE LASER SINTERING

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

The present invention relates to forming a part with an integrally formed attachment device via selective laser sintering or the like.

Prior art pipes may be fabricated with flanges which are bolted together with nuts and bolts. In particular, the flanges of two mating prior art pipes may have a plurality of bolt holes about a periphery of the flanges. The bolt holes of a first pipe flange correspond, or otherwise, have the same pattern of bolt holes as the flange of a second pipe. The pipe flanges of the first and second pipes are aligned to each other, and bolts are inserted through the bolt holes and screwed onto a nut. The bolts and nuts apply clamping pressure onto the flanges to join the pipes together.

Once the pipes are joined together, they are typically disassembled and reassembled during maintenance or failure. During disassembly, maintenance personnel must remove the bolts and the nuts from each of the bolt holes. Further, maintenance personnel must keep track of the bolt and nut combination for each flange. In a large pipe system, the number of bolts and nuts may be enormous such that keeping track of all the nuts and bolts is too difficult or impossible.

To aid maintenance personnel, nut plates may be used to permanently retain the nut next to its bolt hole in an aligned position such that the bolt may be removed from the nut without having to keep track of the nut. In particular, the nut plate may have two opposed retaining holes, and the nut may have two outwardly protruding spring clips. The spring clips are inserted into the retaining holes to retain the nut on the nut plate. Since the nut plate is attached next to the bolt hole, the nut is also retained next to the bolt hole. Accordingly, during maintenance or repair, when the bolts are removed from the nuts, the nuts remain next to the bolt holes such that the nuts are not lost. The nut plates also help maintenance during disassembly and reassembly of pipes when nuts are located behind a wall or a place where the nuts cannot be reached by maintenance personnel.

Unfortunately, there are a few disadvantages with this nut plate system. The nut plate is typically attached to the pipe flange with two rivets. To this end, the rivets are inserted into two holes formed in the nut plate as well as the flange. The holes in the flange weaken the flange by causing stress concentrations therein. Another disadvantage with this system is that time is required to attach the nut plate to the pipe flange thereby increasing initial assembly cost of the pipe system.

Accordingly, there is a need in the art for an improved method and apparatus.

BRIEF SUMMARY OF THE INVENTION

The present invention addresses the above-described deficiencies as well as other deficiencies associated with the prior art. In an aspect of the present invention, an attachment device is integrally formed with a part via a process known as selective laser sintering or the like. By way of example and not limitation, the attachment device may be a nut plate for a nut or a spring clip. The nut plate, which is integrally formed with a bolt hole of the flange, may comprise a pair of side walls attached to a base having a bolt hole. The nut plate captures the nut in the nut plate such that the nut remains next to or adjacent the bolt hole even when a bolt is removed from the nut during maintenance or repair. It is contemplated within the scope of the present invention that the entire nut plate, base and side walls may be integrally formed with the part. Accordingly, a separate step is not required to attach the nut plate to the part when initially assembling the pipe system thereby saving assembly time. Additionally, since the nut plate is integrally formed with the part, the part is not weakened by rivet holes typically used to attach the nut plate to the part.

In the alternative, only the salient features of the attachment device may be integrally formed with the part. For example, the salient features of the nut plate discussed above are a pair of retaining openings formed in the sidewalls. The retaining openings receive a pair of corresponding spring clips of the nut. It is the engagement between the nut spring clip and the sidewall retaining openings which captures the nut in the nut plate. Hence, the retaining opening is the salient feature of the nut plate. When only the salient feature of the attachment device is integrally formed with the part, then by way of example and not limitation, only the sidewalls are integrally formed with the part. The base of the nut plate is not formed with the part. This is advantageous because the nut plates have a lower profile thereby saving space.

The part and the attachment device may be fabricated from any type of material used in conjunction with selective laser sintering, stereo lithography or the like. By way of example and not limitation, in selective laser sintering, the part and the attachment device may be integrally formed from material such as polyamide 12, sold by E.I. du Pont de Nemours and Company as NYLON 12, glass filled polyamide, sold by E.I. du Pont de Nemours and Company as glass filled NYLON, polystyrene and the like.

Although the various aspects of the present invention were discussed in relation to a nut plate, any type of attachment device may be made integral with any type of part.

BRIEF DESCRIPTION OF THE DRAWINGS

These as well as other features of the present invention will become more apparent upon reference to the drawings wherein.

DETAILED DESCRIPTION OF THE INVENTION

The drawings referred to herein are for the purposes of illustrating the various aspects of the present invention and are not meant to limit the scope of the present invention. FIG.

Figure 1:
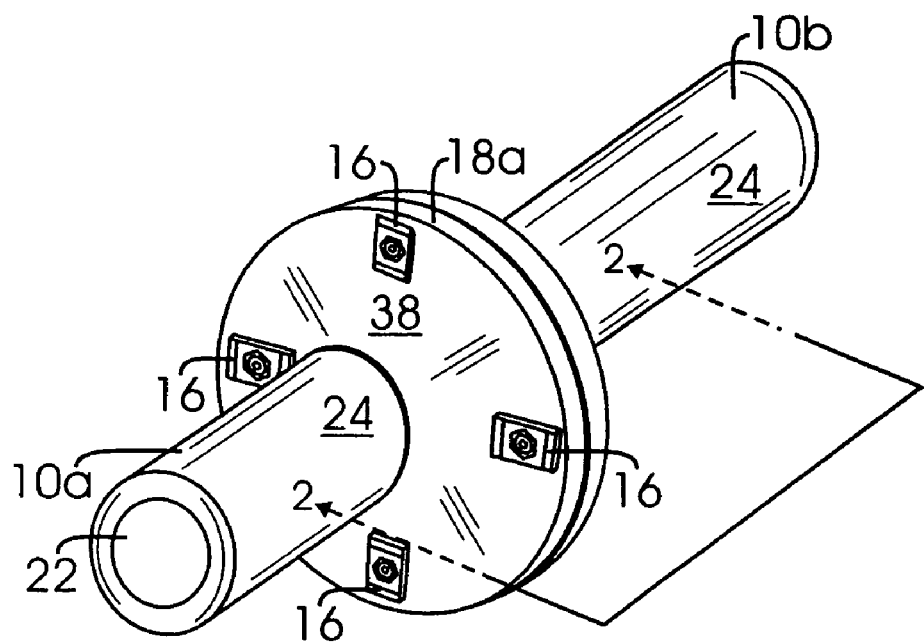
FIG. 1 is a perspective view of two pipes formed via selective laser sintering with one of the two pipes having integrally formed nut plates.
Figure 2:
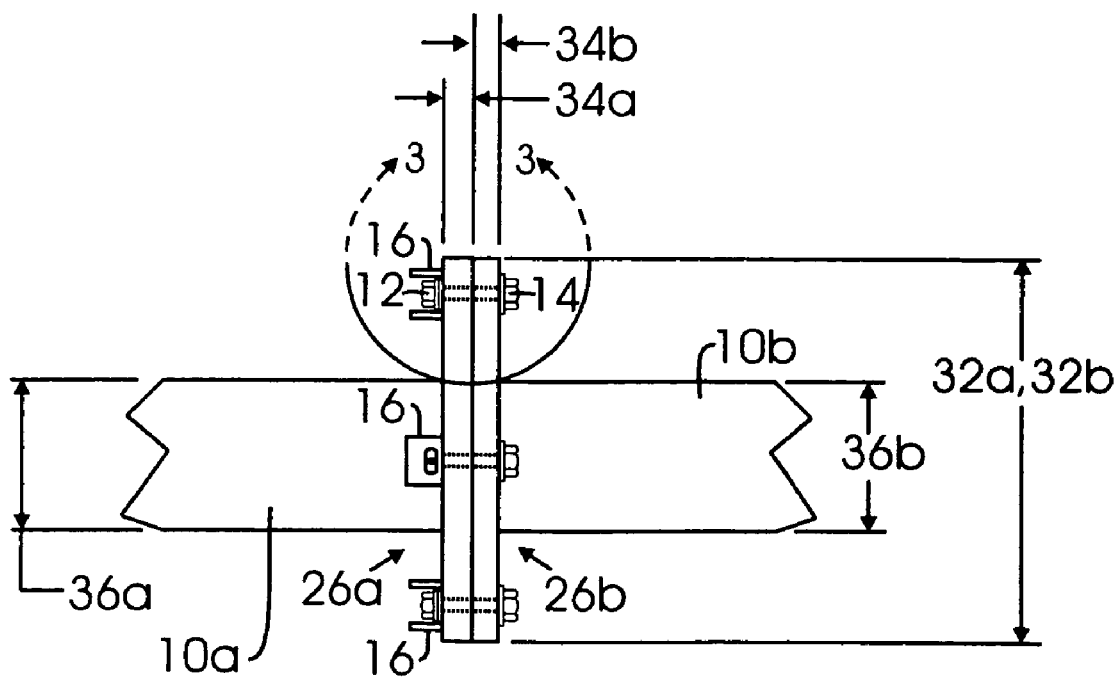
FIG. 2 is a front plane view 2-2 of the two pipes of FIG. 1.
Figure 3:
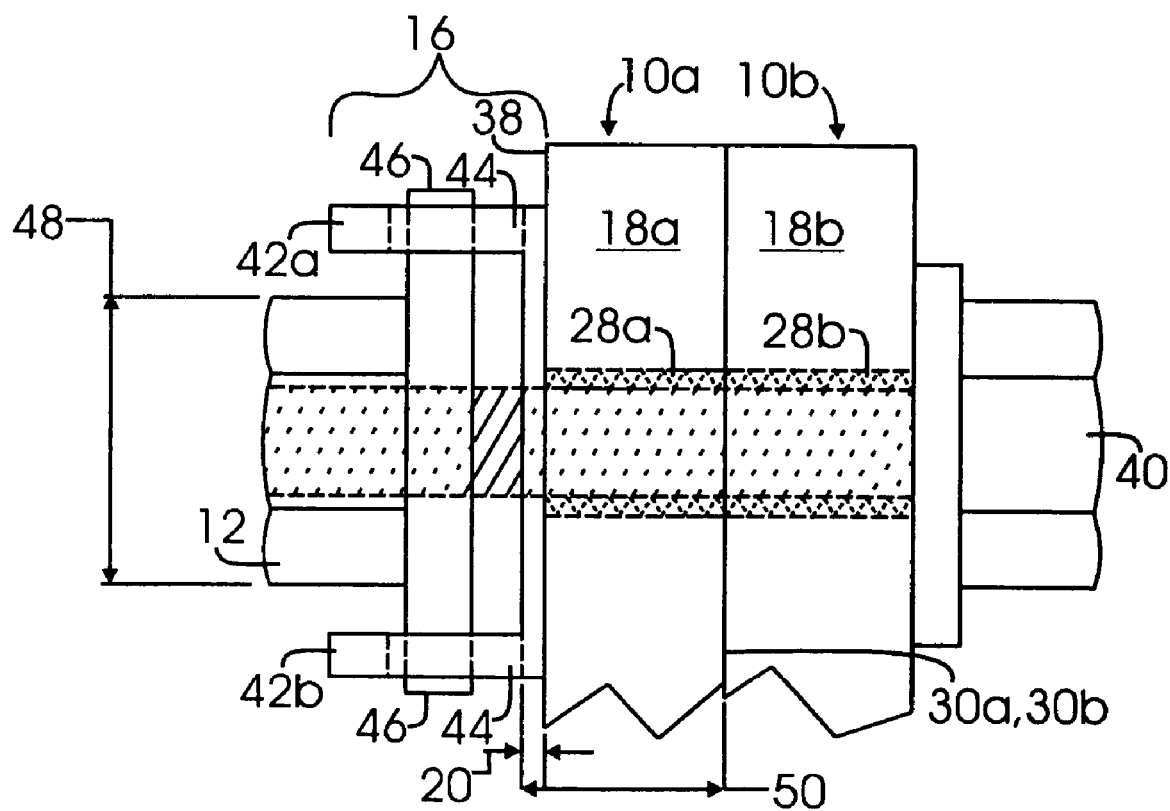
FIG. 3 is a cross sectional view 3-3 of the pipe flange including an integrally formed nut plate.

1 illustrates two pipes 10a, 10b which have been joined together via sets of nuts 12 (see FIG. 2) and bolts 14 (see FIG. 2). The nuts 12 are inserted into nut plates 16 (see FIGS. 1-3) which are integrally formed with the pipe 10a. FIG. 3 illustrates a flange 18a of pipe 10a. The nut plates 16 retain the nuts 12 in the nut plates 16 such that the nuts 12 are not lost when the pipes 10a, 10b are disassembled.

Figure 6:
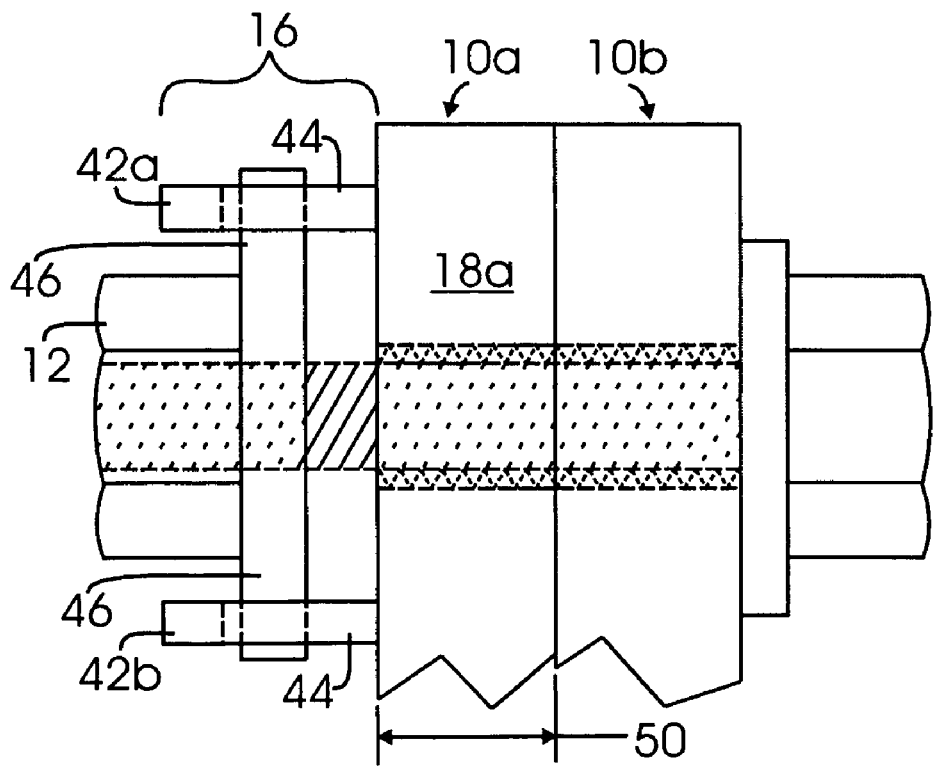
FIG. 6 is a cross sectional view of a pipe flange with an alternate nut plate integrally formed with the pipe flange.

The integral formation of the nut plates 16 with the pipe 10a reduces the time to initially assemble the system of pipes 10a, 10b. The reason is that the time to attach the nut plate 16 to the pipe 10a is eliminated or not required to initially assemble the pipe system 10a, 10b. Additionally, the integral formation of the nut plates 16 with the pipe 10a forms a pipe that has a greater strength compared to a pipe that has nut plates that are mechanically attached to the pipe. The reason is that nut plates that are mechanically attached to the pipe are attached with two rivets. The two rivets require two rivet holes to be drilled through the pipe flanges which weaken the strength of the pipe. When the nut plates 16 are integrally formed with the pipe 10a, no holes are drilled through the pipe 10a. As such, nut plates 16 integrally formed with the pipe 10a maintains the strength of the pipe 10a. Furthermore, the integral formation of the nut plates 16 with the pipe 10a forms a pipe system that requires less space compared to a pipe system where nut plates are mechanically attached to the pipes. The reason is that pipe 10a does not have to provide space for the rivet heads and nut plate bases 20 (compare FIGS. 3 and 6) that attaches the nut plates 16 to the pipe 10a. FIG. 3 illustrates a nut plate 16 integrally formed with pipe 10a. In contrast, FIG. 6 illustrates a nut plate without a nut plate base integrally formed with pipe 10a. In sum, integrally forming the nut plates 16 with the pipe 10a has many advantages, some of which are listed herein.

Referring more particularly to FIG. 1, two pipes are illustrated, namely, a first pipe 10a and a second pipe 10b. These two pipes 10a, 10b may represent only two pipes within a pipe system. For example, the system of pipes may be a system which cools and/or heats the interior of a plane, train or building. However, for the purposes of describing the various aspects of the present invention clearly, only two pipes 10a, 10b from the pipe system are shown.

Each pipe 10a, 10b has a cylindrical inner surface 22 and a cylindrical outer surface 24. On proximate ends 26a, 26b (see FIG. 2) of the pipes 10a, 10b, a flange 18a, 18b (see FIG. 3) is formed which is used to join the two pipes 10a, 10b together. The flange 18a of the first pipe 10a has a plurality of holes 28a (see FIG. 3) which are sized and configured with respect to a plurality of holes 28b (see FIG. 3) formed in the flange 18b of the second pipe 10b. The pipes 10a, 10b are joined by aligning the holes 28a of the first pipe flange 18a to the holes 28b of the second pipe flange 18b, as shown in FIGS. 2 and 3. When the pipes 10a, 10b are joined, the cylindrical inner surface 22 of the first pipe 10a may also be aligned to the cylindrical inner surface of the second pipe 10b. Accordingly, the joined pipes 10a, 10b form a hollow passageway for fluid or gas to flow through the cylindrical inner surfaces 22 of the first and second pipes 10a, 10b. Since the pipes 10a, 10b shown in FIG. 1 only represent two pipes within the pipe system, the pipe system is contemplated to have a plurality of pipes which may be joined together as described herein to form the pipe system. Additionally, although the various aspects of the present invention are discussed in relation to cylindrical pipes, the various aspects of the present invention may also be employed with square pipes or other parts.

As stated above, both pipes 10a, 10b may each have a flange 18a, 18b formed at proximate end 26a, 26b of the pipe 10a, 10b. These flanges 18a, 18b are used to join the first pipe 10a to the second pipe 10b. Each flange 18a, 18b may define an interior surface 30a, 30b (see FIG. 3) which is defined by the surfaces of the first and second pipes 10a, 10b which mate with each other when the first pipe 10a is joined to the second pipe 10b. Each flange 18a, 18b may have a circular configuration defining a diameter 32a, 32b and a thickness 34a, 34b, as shown in FIG. 2. The diameter 32a of the first pipe flange 18a may be equal to the diameter 32b of the second pipe flange 18b such that their diameters are flush with each other. (see FIGS. 1 and 2) Additionally, the diameter 32a of the first pipe flange 18a may be sufficiently greater than an outer diameter 36a of the first pipe 10a such that the nut plates 16 may be integrally formed on the exterior surface 38 of the first pipe flange 18a. (see FIG. 3). Also, the diameter 32b of the second pipe flange 18b may be sufficiently greater than an outer diameter 36b of the second pipe 10b such that bolt heads 40 can clamp the first pipe 10a to the second pipe 10b. (see FIG. 3). The flange thickness 34a, 34b (see FIG. 2) must be sufficiently thick to withstand the forces created by the structure in which the pipe system is installed. For example, if the structure is an airplane, then the flange thickness 34a, 34b must be sufficiently thick to withstand stresses created during flight of the airplane. The flange thickness 34a, 34b must also be sufficiently thick to withstand the stresses created by the medium flowing through the pipe system. For example, if the medium is reciprocating air, then the flange thickness 34a, 34b must be sufficiently thick to withstand stresses created by air reciprocating within the pipe system.

FIG. 2 is a side view of the first and second pipes 10a, 10b shown in FIG. 1. As shown, the first pipe 10a is joined to the second pipe 10b by a plurality of nuts 12 and bolts 14 which are inserted into a plurality of corresponding holes 28a, 28b formed within the first and second pipes flanges 18a, 18b. The nut plates 16 are integrally formed only with the first pipe 10a. However, it is also contemplated within the scope of the present invention that an attachment device may also be integrally formed with the second pipe 10b also. By way of example, a bolt retainer which is similar to a nut plate except for bolts may be integrally formed with the second pipe 10b. Additionally, although not shown, pipe elbows, reducers and the like may be integrally formed with the first pipe 10a and/or the second pipe 10b. As such, these components do not have to be attached to the first pipe 10a and/or the second pipe 10b when initially assembling the pipe system thereby saving assembly time when initially assembling the pipe system together.

As stated above, the first pipe 10a may be joined to the second pipe 10b via a plurality of sets of nuts 12 and bolts 14 which are inserted through a plurality of corresponding holes 28a, 28b of the first and second pipe flanges 18a, 18b. In particular, the first pipe 10a has a nut plate 16 which is integrally formed with the first pipe 10a, and more particularly, with the first pipe flange 18a. The nut plate 16 has two opposed side walls 42a, 42b (see FIG. 3) which are generally parallel with each other and generally perpendicular to the exterior surface 38 of the first pipe flange 18a. The two side walls 42a, 42b each have a retaining opening 44 to receive spring clips 46 (discussed below).

A nut 12 (see FIG. 3) may be provided when joining the first pipe 10a to the second pipe 10b. The nut 12 may have internal threads which may be threaded onto a bolt 14. Two spring clips 46 may be attached to the nut 12 such that they are protruding outwardly from the nut 12, as shown in FIG. 3. The spring clips 46 may be positioned so as to be diametrically opposed to each other. The two spring clips 46 and the retaining openings 44 may be sized, configured and positioned in relation to each other such that each spring clip 46 is insertable and retainable within each respective retaining opening 44 of the side walls 42a, 42b. The nut diameter 48 or size is sufficiently large such that the spring clips 46 do not slip out of the retaining openings 44. As such, the nuts 12 are retained within the nut plates 16 even when bolts 14 are removed from the nuts 12.

The bolt 14 may also be provided when the first pipe 10a is joined to the second pipe 10b. The bolt 14 is inserted through holes 28a, 28b of the first and second pipes 10a, 10b on an opposed side of the flange 18b with respect to the nut 12. The bolt 14 is then threaded onto the nut 12 captured within the nut plate 16. The bolt head 40 is larger than the hole 28b and the nut 12 is also larger than the hole 28a. As such, when the bolts 14 are tightened onto the nuts 12, the flanges 18a, 18b are tightened onto each other. Hence, the first pipe 10a is joined to the second pipe 10b.

As stated above, the bolt 14 is inserted into the nut 12 captured by the nut plate 16. The nut 12 captured within the nut plate 16 is allowed to float within the nut plate to an extent that the bolt 14 when inserted through the holes 28a, 28b of the first and second pipe flanges 18a, 18b is aligned to the threads of the nut 12. More particular, the nut threads, bolt threads, and the holes 28a, 28b of the first and second pipe flanges 18a, 18b each define a central axis. The axes of the holes 28a, 28b of the first and second pipes 10a, 10b are aligned to allow the bolt 14 to pass through the holes 28a, 28b. When the axes of the holes 28a, 28b of the first and second pipes 10a, 10b are aligned to each other, the central axis of the nut thread is allowed to float with respect to the holes 28a, 28b central axes. However, the nut thread central axis is sufficiently aligned to the holes 28a, 28b central axes such that the bolt threads engage the nut threads when the bolt 14 is inserted into the holes 28a, 28b of the first and second pipe flanges 18a, 18b.

As stated above, the nut plates 16 may be integrally formed with the pipe 10a and more particularly, the pipe flange 18a. By way of example and not limitation, the nut plates 16 may be formed on the flange 18a as a unitary feature of the flange 18a and pipe 10a via selective laser sintering. By way of example and not limitation, the pipe 10a, flange 18a and nut plates 16 may be fabricated within a selective laser sintering machine as a single part. Accordingly, the step of attaching the nut plate 16 to the pipe flange 18a with rivets is eliminated when initially assembling the pipe system because the nut plate 16 is integrally formed with the pipe flange 18a.

Figure 4:
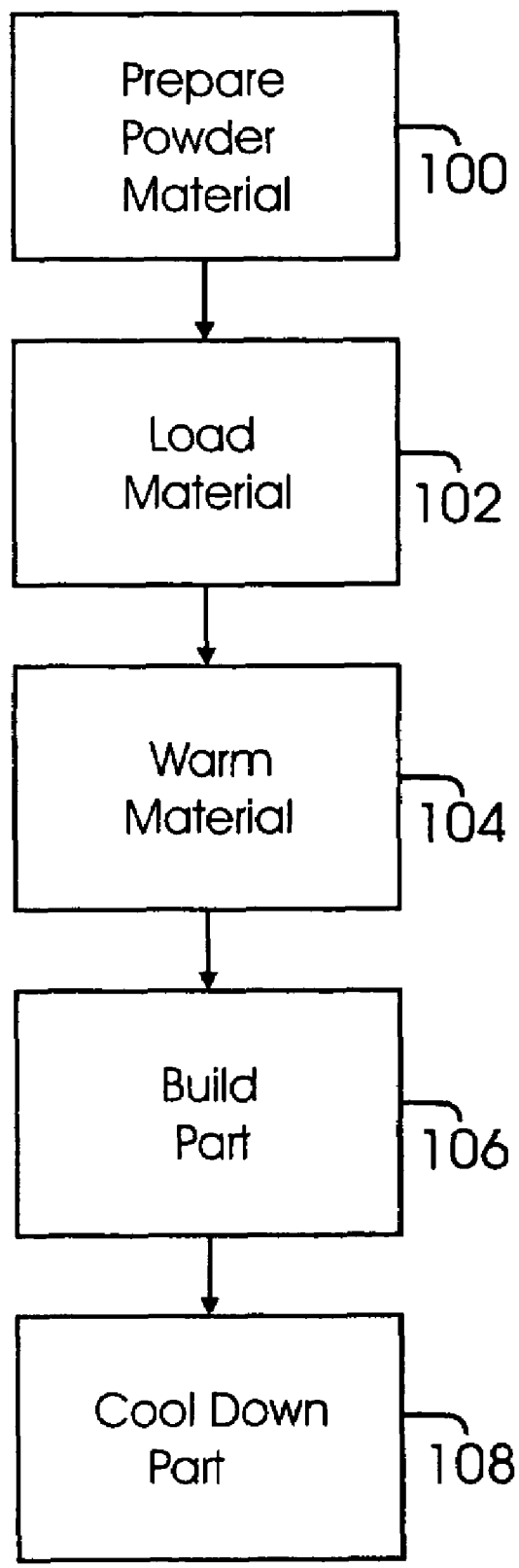
FIG. 4 is a flow chart illustrating a selective laser sintering process.
Figure 5:
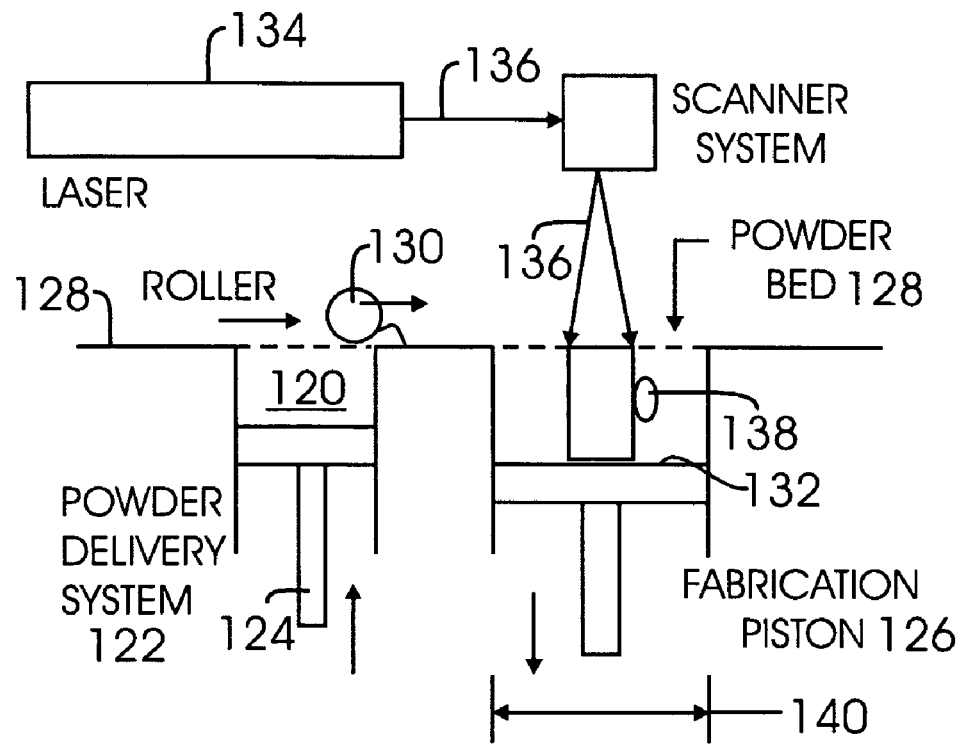
FIG. 5 is a pictorial diagram of a selective laser sintering machine.

Selective laser sintering encompasses the steps of preparing a powder material 100, loading the powder material into a laser sintering machine 102, warming up the powder material 104, building the part 106, and cooling down the part 108, as shown in FIG. 4. By way of example and not limitation, FIG. 5 is a pictorial illustration of the selective laser sintering process. First, the powder material 120 which may comprise polyamide 12, sold by E.I. du Pont de Nemours and Company as NYLON 12 is prepared and disposed within the powder delivery system 122. At the initial state, the delivery piston 124 is at a lowered position, and a fabrication piston 126 is at a raised position. Second, the delivery piston 124 is raised incrementally to raise the powder level above a bed 128 of the powder delivery system 122. Third, a roller 130 sweeps across the powder delivery system bed 128 to push a layer of the powder material 120 onto the upper surface 132 of the fabrication piston 126. Fourth, the laser 134 emits a laser beam 136 which traces a pattern over the surface of the powder bed 136 received onto the fabrication piston 126. The pattern is a two dimensional cross section of the part. The laser beam 136 selectively melts and bonds the powder material together. As the above mentioned steps are repeatedly performed, the delivery piston 124 is raised and the fabrication piston 126 is lowered to receive additional powder material 120. The part is built one cross section at a time on the fabrication piston126. Additionally, protrusions 138 of the part are supported within the fabrication system 140 via the non-melted and non-burned powder on the fabrication piston 126.

A plurality of nut plates 16 may be formed on the first pipe flange 18a via the selective laser sintering process or the like. The nut plates 16 may be formed about the perimeter of the first pipe flange's diameter. For example, as shown in FIG. 1, the nut plates 16 are integrally formed about the perimeter of the first pipe flange's diameter 90 degrees apart from each other. It is also contemplated that the nut plates 16 may be formed about the pipe's diameter at different degrees of separation such as 60, 45, and 30 degrees. The equidistant spacing of the nut plates 16 about the pipe's diameter is for the purpose of providing uniform pressure between the flanges 18a, 18b of the first pipe 10a and the second pipe 10b. However, it is also contemplated within the scope of the present invention that the spacing between nut plates 16 are varied. The quantity, spacing and position of the nut plates 16 on the flange 18a may be dependent upon the various stresses between the first and second pipes 10a, 10b determined by the design parameters of the pipe system.

Once the nut plates 16 are integrally formed on the pipe flange 18a via selective laser sintering, the nut 12 may be engaged to the nut plate 16 by inserting the spring clips 46 into the retaining holes 44 such that the nut 12 remains aligned to corresponding holes 28a of the first pipe flange 18a even though the bolt 14 is removed from the nut 12. This helps to prevent nuts 12 from being lost when pipes 10a, 10b are being taken apart for maintenance purposes or repair.

Integrally forming the nut plate 16 (i.e., attachment device) with the first pipe flange 18a (i.e., part) has many advantages. By way of example and not limitation, in the prior art, a bolt hole of the nut plate had to be aligned to a bolt hole of the first pipe flange when attaching the nut plate to the first pipe flange. By utilizing the various aspects of the present invention discussed herein, the bolt holes of the nut plate and the flange are essentially a unitary hole 28a. Hence, the bolt holes of the prior art nut plate and the prior art pipe flange do not need to be aligned when attaching the nut plate to the pipe flange. Another advantage is that the first pipe flange 18a is not made weaker by attaching the nut plate 16 to the first pipe flange 18a. In particular, in the prior art, rivet holes had to be drilled through the first pipe flange to connect the prior art nut plate to the prior art first pipe flange. The rivet holes weaken the prior art first pipe flange. By utilizing the various aspects of the present invention discussed herein, rivet holes are not drilled through the pipe flange 18a to attach the nut plate 16 to the first pipe flange 18a. Rather, the nut plate 16 is integrally formed with the first pipe flange 18a. Hence, the first pipe flange 18a with an integrally formed nut plate 16 is stronger compared to prior art pipe flanges with nut plates attached thereto with rivets.

Another advantage is that the nut plate 16 integrally formed with the part may consume less space than the prior art nut plate attached to the prior art first pipe flange via rivets. The reason is that the base of the nut plate 16 does not have to be integrally formed with the first pipe flange 18a. Rather, only the nut plate side walls 42a, 42b may be integrally formed with the first pipe flange 18a thereby eliminating the base of the nut plate. For example, FIG. 3 illustrates a nut plate 16 formed integrally with the flange 18a of the pipe 10a. As shown, the nut plate 16 has a pair of side walls 42a, 42b that are parallel to each other. Each of the side walls 42a, 42b are joined to the pipe flange 18a via a base 20 of the nut plate 16. The nut plate base 20 extends between the pair of sidewalls 42 and is perpendicular to the pair of sidewalls 42.

In contrast, FIG. 6 illustrates a second embodiment of the nut plate 16 integrally formed with the first pipe flange 18a. The nut plate 16 has a pair of sidewalls 42a, 42b which are sized and configured to receive the nut 12 therebetween. Each side wall 42a, 42b has a retaining opening 44 to receive the spring clip 46 of the nut 12. However, the sidewalls 42a, 42b are not joined to each other through the nut plate base 20 (see FIG. 3), the side walls 42a, 42b are directly joined to the first pipe flange 18a. This embodiment saves space and weight because the nut plate base 20 is not integrally formed with the first pipe flange 18a. The nut plate base 20 is eliminated. Hence, the total space required for the nut plate 16 may be reduced by the thickness of the nut plate base 20. Also, the total weight of the part is reduced by the weight of the nut plate base 20.

The decision to integrally form the nut plate base 20 with the pipe flange 18a may be based on the gripping force required to join the two pipes 10a, 10b together. In particular, the nut plate 16 and the flange 18a may define a gripping thickness 50 (compare FIGS. 3 and 5) which is sized to be sufficient to withstand the gripping force created when the bolt 14 and nut 12 are tightened onto each other.

The various aspects of the present invention were discussed in relation to selective laser sintering. It is further contemplated that the various aspects of the present invention may also be practiced in conjunction with stereo lithography technology. A stereo lithography system may have laser which can direct a laser beam along X and Y axes, a Z axis controlled table, and a tank of liquid resin. The table may be immersed within the resin and its top surface positioned slightly below the top surface of the resin. The laser emits a laser beam onto the resin above the table in a pattern resembling an X-Y cross section of the part to be built. The resin hardens and rests on the table top surface. The table is slightly lowered such that additional resin may cover the previously hardened resin. Again, the laser emits a laser beam onto the resin in a pattern resembling an X-Y cross section of the part to be built. This process is repeated until the entire part is immersed within the resin. The table is raised. The part is removed from the tank and the resin is removed from the part.

Further, the various aspects of the present invention were discussed in relation to nut plates 16 and integrally forming the nut plates 16 into the first pipe flange 18a. It is further contemplated within the scope of the present invention that any type of mechanical fastener may be integrally formed with the part. For example, two pipes may be joined with a prior art sleeve used to join two pipes. In particular, the sleeve may be integrally fabricated with the first pipe. The sleeve portion of the first pipe may define an inner diameter which is sized and configured to fit around the outer diameter of a second pipe. During assembly, the second pipe may be inserted into the sleeve integrally formed with the first pipe via selective laser sintering or stereo lithography.

In another aspect, a plurality of spring clips may be integrally formed with the flange. The spring clips may peripherally surround the nut when the nut is inserted between the plurality of spring clips. In use, the nut may press on the upper portions of the spring clips. The spring clips would be sized and configured to move away from a center of the plurality of spring clips to allow the nut to be inserted between the spring clips. Once the nut has been inserted between the spring clips, the spring clips may draw toward the center of the plurality of spring clips and cover the nut to hold the nut in place.

Additional modifications and improvements of the present invention may also be apparent to those of ordinary skill in the art. Thus, the particular combination of parts and steps described and illustrated herein are intended to represent only certain embodiments of the present invention, and is not intended to serve as limitations of alternative devices or methods within the spirit and scope of the invention.

What is claimed is:

1. A method of assembling a first part and a second part, the method comprising the steps of:
    a. providing a nut having a nut body portion;
    b. preparing a powder material solidifiable with a laser beam;
    c. loading the material into a tank;
    d. tracing a laser beam onto the material to solidify the material in a pattern;
    e. moving additional powder material above the solidified material;
    f. integrally forming the first part having a bolt hole defining a bolt hole axis and a nut retaining bracket having at least one side wall which protrudes outwardly from the first part generally parallel with the bolt hole axis by repeating steps e and d;
    g. engaging the nut to the at least one side wall of the nut retaining bracket while permitting limited displacement of the nut with respect to the at least one side wall of the nut retaining bracket; and
    h. engaging a mating bolt to the nut to assemble the first part to the second part.

2. The method of claim 1 wherein the loading step c includes the step of loading polyamide 12, glass filled nylon or polystyrene into the tank.

3. The method of claim 1 wherein step (e) comprises rolling a quantity of the powder material onto a fabrication piston.

4. The method of claim 1 wherein step (f) includes the step of integrally forming an air duct and the nut retaining bracket.

5. The method of claim 1 wherein step (f) includes the step of integrally forming a flange and the nut retaining bracket.

6. The method of claim 1 wherein step (f) includes the step of integrally forming the first part and at least three nut retaining brackets about a periphery of the first part.

7. The method of claim 1 wherein step (g) includes the steps of inserting a spring clip into a retaining opening of the sidewall and fixedly engaging the spring clip to the nut body portion to limit displacement of the nut generally along the bolt hole axis.

8. The method of claim 1 wherein step f) includes the step of integrally forming the first part and the nut retaining bracket with two sidewalls with the bolt hole and the bolt hole axis between the two sidewalls of the nut retaining bracket.

9. The method of claim 8 wherein:
    the integrally forming step f) comprises the step of integrally forming the first part and the nut retaining bracket having two sidewalls with a retaining opening in each sidewall; and
    further comprising the step of engaging a spring clip within the retaining opening and to the nut body portion while permitting limited displacement of the spring clip within the retaining opening.

10. A method of assembling a first pan and a second part, the method comprising the steps of:
    a. providing a nut having a nut body portion;
    b. integrally forming the first part with a nut retaining bracket via stereo lithography, the nut retaining bracket having two sidewalls protruding outwardly from the first part, the nut retaining bracket being sized and configured to receive the nut between the two sidewalls, the first part including a bolt hole defining a bolt hole axis wherein the bolt hole is formed in the first part and the bolt hole axis is disposed between the two sidewalls, the two sidewalls protruding outwardly from the first part generally parallel with the bolt hole axis, the bolt hole configured to receive a bolt;

c. engaging the nut to the nut retaining bracket while permitting limited displacement of the nut proximate the bolt hole axis such that the nut remains aligned to the bolt hole axis when the first and second parts are disassembled; and d. engaging a mating bolt to the nut to assemble the first part to the second part.

11. The method of claim 10 wherein step b includes the step of integrally forming an air duct with the nut retaining bracket.

12. The method of claim 10 wherein step (c) includes the steps of inserting a spring clip into a retaining opening formed in at least one of the two sidewalls and engaging the spring clip to the nut body portion to limit displacement of the nut along the bolt hole axis when the first and second parts are disassembled.

13. The method of claim 10 wherein step (c) includes the steps of inserting a spring clip into a retaining opening of the sidewall and fixedly engaging the spring clip to the nut body portion to limit displacement of the nut generally along the bolt hole axis.

* * * * *